July 30, 1929.  A. CHERNIAVSKY  1,722,410
PIANO ATTACHMENT
Filed Feb. 13, 1928
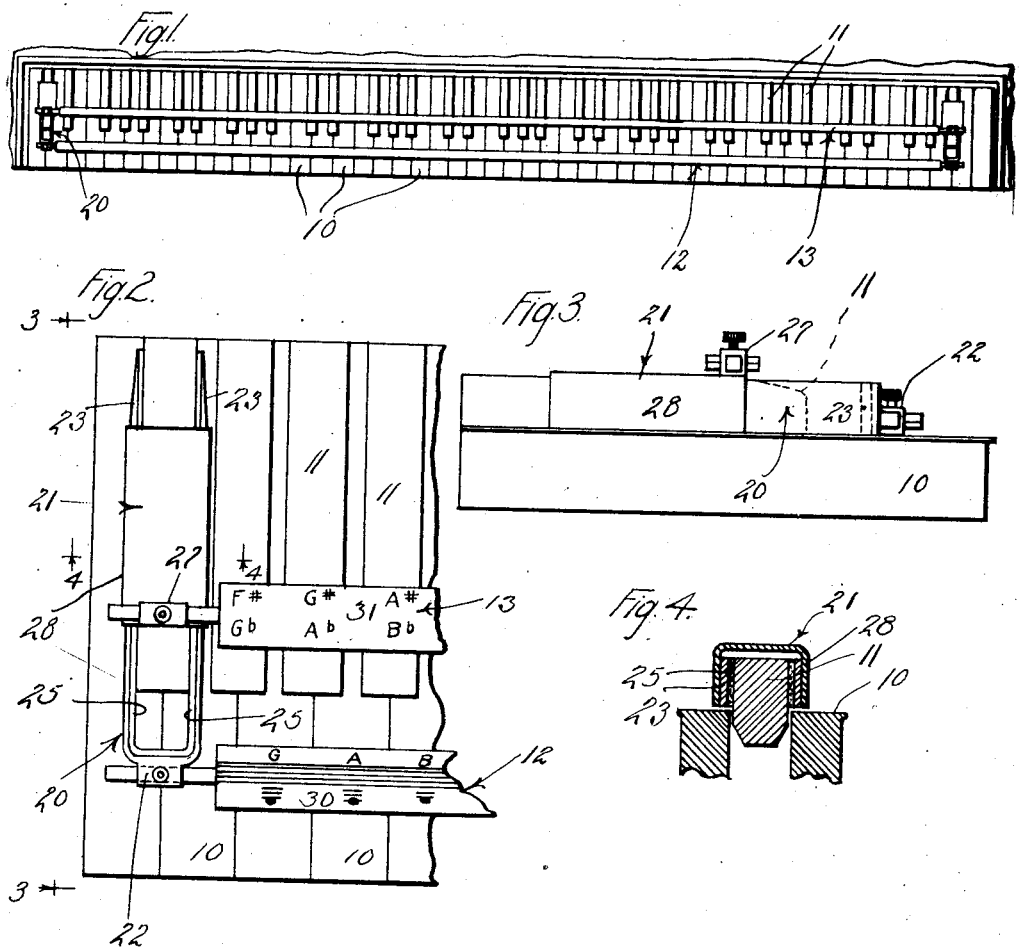
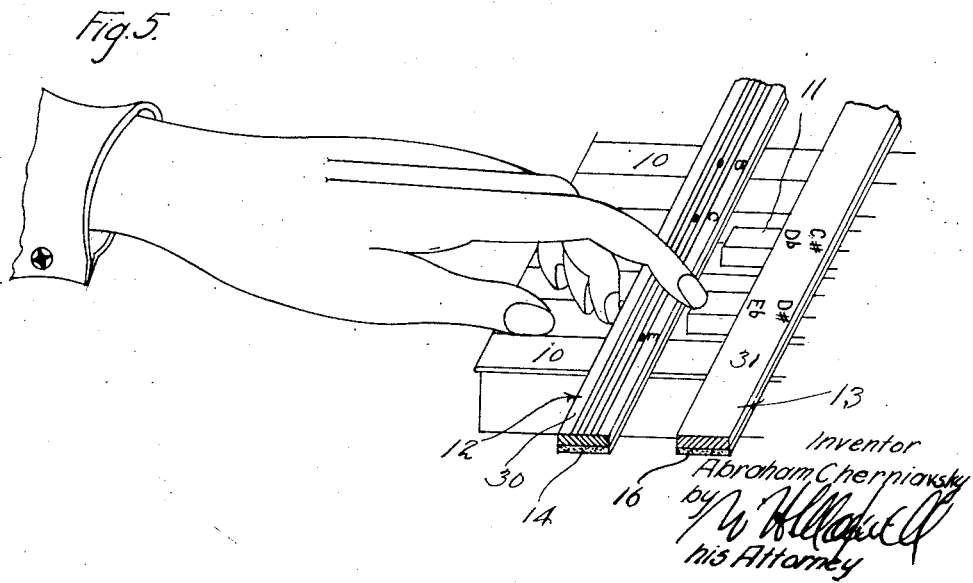
Inventor
Abraham Cherniavsky
by
his Attorney Patented July 30, 1929.

1,722,410

UNITED STATES PATENT OFFICE.

ABRAHAM CHERNIAVSKY, OF LOS ANGELES, CALIFORNIA.

PIANO ATTACHMENT.

Application filed February 13, 1928. Serial No. 253,870.

This invention has to do with a piano attachment, and it is an object of the invention to provide an attachment to be used in training a player in the proper positioning of the hands with reference to the key board and in teaching the various notes of the key board.

In accordance with the approved method of playing a piano, or like key board instrument, the palm of the hand is held elevated and is somewhat cupped so that the notes are struck with the tips of the fingers pointing or facing downwardly.

Considerable difficulty is usually experienced in training a pupil to maintain the hands in the proper position and to this end devices have heretofore been proposed for engaging the players wrists or hands to positively prevent their being lowered from the correct position. These devices have involved various parts and in most cases operate to materially hinder the operation of the hands.

It is a primary object of this invention to provide a device applicable to a piano, or the like, to aid a player in developing the proper positioning of the hands with reference to the key board.

Another object of this invention is to provide a device of the character mentioned which effectively accomplishes the desired results without direct bearing engagement with or positive attachment to the players hands.

A further object of the invention is to provide an attachment of the character mentioned, which is readily applicable to an ordinary instrument key board and which is adjustable to suit various playing conditions.

It is another object of this invention to provide an attachment of the character mentioned embodying or carrying markings, which operate to identify the various notes of the key board and thus aid the player in locating the notes.

Another object of the invention is to provide an attachment of the character mentioned, which does not in any way project from the piano to be in the way of the player, and which can be applied to a piano without in any way marring or disfiguring it.

The various objects and features of the invention will be best and more fully understood from the following detailed description of a typical form and application of the invention throughout which description reference is had to the accompanying drawings, in which:

Fig. 1 is a plan view of a typical piano key board showing the attachment provided by this invention applied thereto.

Fig. 2 is an enlarged view of a portion of the key board showing one end of my attachment.

Fig. 3 is a view taken as indicated by line 3—3 on Fig. 2.

Fig. 4 is a sectional view taken as indicated by line 4—4 on Fig. 2, and

Fig. 5 is a perspective view illustrating the manner in which the device operates in training a player to hold the hand in the proper position with reference to the key board.

The device provided by this invention is intended primarily for attachment to a key board such as is used in a piano, and therefore I will describe the invention as applied to a piano key board; it being understood that the principles of the invention can be likewise applied to other instrument key boards. The standard or ordinary piano key board as shown in the drawings includes a plurality of horizontally arranged series of principal keys, shown ordinarily as the white notes or keys 10 and a plurality of flat and sharp notes, known as black notes or keys 11. The black keys are located between the principal or white keys 10 and are shorter than the white keys so that the white keys project a substantial distance forward of the black keys. Further the black keys are raised with reference to the white keys so that they project vertically above the white keys. The black keys are spaced or grouped in a certain predetermined manner with reference to the white keys 10, however, such details do not directly concern the present invention and therefore will not be described.

The attachment provided by this invention provides, generally, a gage or stop 12 to be arranged at the white keys of a key board, a gage or stop 13 to be arranged at the black keys of the key board and means detachably and adjustably mounting the stops 12 and 13 on the key board.

The stop 12 to be arranged in connection with the white keys 10 of the key board is an elongate member such as a strip of metal or wood adapted to extend in the direction of the key board from one end thereof to the other. In the case of a straight key board such as is found in a piano the stop 12 is a straight member sufficiently long to extend from one end of the key board to the other. In practice the stop 12 may rest on the keys 10 in which case it is provided with a pad 14 of felt, or the like, so that no noise results from the keys 10 returning into engagement with the stop after being operated. The stop 12 is designed primarily to confine the playing of the keys 10 at their tip or outer end portions. It is therefore located forward of the black keys 11 and just far enough inward from the outer ends of the keys 10 to leave the tip portions of the keys 10 exposed for operation. In practice the exact positioning of the stop 12 may be varied depending upon various factors obvious to one skilled in the art.

The stop 13 is provided to operate with reference to the black keys 11 in substantially the same manner as the stop 12 operates with reference to the white keys 10. The stop 13 extends over or along the tops of the black keys 11 from one end of the key board to the other, and is positioned so that the desired tip portions of the black keys are exposed for operation. The stop 13 may engage or rest upon the tops of the black keys 11 in which case it is preferably provided with a pad 16 of felt or the like similar to the pad 14 above described. It is to be understood, of course, that the stop 13 may be formed of a strip of metal, wood or other suitable material.

The mounting means provided for detachably mounting the strips 12 and 13 in the desired position with reference to the keys 10 and 11 preferably includes a mounting device or bracket at each end of the key board. In accordance with my preferred form of construction each mounting device includes a U-shaped clamp 20 for holding the stop 12 and for engaging one of the black keys 11 and a clamp 21 for holding the stop 13 and for mounting on one of the black keys 11.

The clamp 20 is provided with a holder or socket 22 to receive the end of the stop 12 and is provided with spaced side parts or jaws 23 related so that they can be arranged on a black key 11 to engage its opposite sides. The jaws 23 are preferably formed and related so that they are somewhat sprung or spread apart upon being engaged on a black key 11 and therefore grip the key so that the clamp remains in position. In practice the clamp 20 may be formed of metal in which case it is desirable to provide a pad or lining 25 of felt or the like on the inner sides of the jaws 23 so that they do not scratch the keys.

The clamp 21 provided for holding the stop 13 may be a U-shaped clamp adapted to fit downwardly over a black key 11; it being preferred to make the clamp so that it will fit over the jaws 23 of the clamp 20 so that both clamps of the mounting means are carried by or engage a single black key. The clamp 21 is provided with a holder or socket 27 to receive and hold the end of the stop 13 and is provided with spaced jaws 28 to fit tightly over the part to carry the clamp. In the case illustrated in the drawings the jaws 28 are proportioned or spaced to fit tightly over the jaws 23 of the clamp 20, therefore they do not directly engage the key 11 of the instrument board. With this arrangement it is unnecessary to provide a pad, or the like, in connection with the clamp 21, and the clamp 21 aids the operation of the clamp 20 in that it engages the jaws 23 holding them tight in engagement with the key 11.

By providing the stops 12 and 13 with mounting clamps such as I have just described it is possible to adjust the stops independently to any desired positions on the keys 10 and 11. It is apparent that the clamp 20 holding the ends of the stop 12 can be located on the black keys 11 so that the stop 12 is held in a desired position on the keys 10, and it will be likewise apparent that the clamps 21 holding the ends of the stop 13 can be arranged to hold the stop 13 in the desired position on the keys 11. It is to be particularly noted that the mounting means provides a releasable means for attaching the stops to the instrument or key board so that the stops can be adjusted in any desired manner and further that the mounting requires no screws, brackets or other devices liable to injure or mar the instrument.

It is well known, of course, that each note in a piano key board is identified by means of a letter and that each key corresponds to a definite note in the musical scale ordinarily being written on a plurality of lines known as a staff. To facilitate teaching of the scale or notes and to aid in identifying the notes in the key board the stops 12 and 13 may be provided with faces 30 and 31, respectively, carrying letters to identify the notes or keys or having marked on them staffs on which are located notes corresponding to the keys. This manner of marking the stops is clearly illustrated in Figs. 2 and 4 of the drawing where it will be apparent how the staffs marked on the faces 30 and 31 together with the letters make it very simple to identify the various notes on the key board.

In using the attachment provided by this invention it is attached to a key board in a manner such as is shown throughout the drawings, care being taken to position it longitudinally of the key board so that the marks on the stops properly register with or correspond to the keys in the key board. The attachment when once properly mounted requires no further attention. A person playing the instrument with the attachment in place is forced to strike the keys 10 at their outer or tip portions and in order to play the black keys 11 one must keep the hand with the palm raised in a manner such as is shown in Fig. 4, otherwise the black keys cannot be reached without a very unsightly and clumsy movement. When holding the hand with the palm elevated or cupped the fingers point downwardly in striking the keys 10 and can be conveniently manipulated to strike the tips of the keys 11 without noticeable exertion and without a material changing of the position of the hand.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. An attachment for an instrument having a key board including a stop member to be arranged longitudinally over the keys of the key board engaging the keys, and means at the ends of the stop member detachably connecting the stop with the instrument.

2. An attachment for an instrument having a key board including a stop member to be arranged longitudinally over the keys of the key board, and means detachably connecting the stop with the instrument, said means including clamps for engaging keys of the instrument.

3. An attachment for an instrument having a key board including a stop member to be arranged longitudinally over the keys of the key board, and means detachably connecting the stop with the instrument, the stop member having a pad engaging the keys.

4. An attachment for an instrument having a key board including a stop member to be arranged longitudinally over the keys of the key board, and means detachably connecting the stop with the instrument, said means including U-shaped clamps for engaging keys of the instrument.

5. An attachment for an instrument having a key board including a stop member to be arranged longitudinally over the keys of the key board, and means detachably connecting the stop with the instrument, said means including clamps for engaging keys of the instruments, and sockets carried by the clamps to hold the ends of the stop member.

6. An attachment for an instrument having a key board with two sets of keys, the keys of one being shorter and higher than these of the other, a stop to be arranged longitudinally along the key board over the lower keys, a stop to be arranged longitudinally along the key board over the higher keys, and means detachably connecting the stops with the instrument.

7. An attachment for an instrument having a key board with two sets of keys, the keys of one being shorter and higher than those of the other, a stop to be arranged longitudinally along the key board over the lower keys, a stop to be arranged longitudinally along the key board over the higher keys, and means detachably connecting the stops with the instrument, including clamps connected with one stop and adapted to engage keys of the instrument, and clamps connected with the other stop and adapted to engage over the first mentioned clamps.

In witness that I claim the foregoing I have hereunto subscribed my name this 2nd day of February, 1928.

ABRAHAM CHERNIAVSKY.